United States Patent
Alexiou et al.

(10) Patent No.: US 7,130,580 B2
(45) Date of Patent: Oct. 31, 2006

(54) METHOD OF COMPENSATING FOR CORRELATION BETWEEN MULTIPLE ANTENNAS

(75) Inventors: Angeliki Alexiou, Swindon (GB); Mohammed Qaddi, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 430 days.

(21) Appl. No.: 10/621,425

(22) Filed: Jul. 17, 2003

(65) Prior Publication Data

US 2004/0185792 A1   Sep. 23, 2004

Related U.S. Application Data

(63) Continuation-in-part of application No. 10/392,935, filed on Mar. 20, 2003.

(51) Int. Cl.
  H03C 7/02   (2006.01)
  H04B 1/02   (2006.01)
  H04B 7/02   (2006.01)

(52) U.S. Cl. ............. 455/39; 455/101; 455/115.1; 455/562.1; 375/267; 375/299

(58) Field of Classification Search ........... 455/101, 455/115.1, 129, 562.1, 67.11; 375/299, 267
See application file for complete search history.

(56) References Cited

U.S. PATENT DOCUMENTS

| | | | |
|---|---|---|---|
| 5,262,785 A | 11/1993 | Silverstein et al. | 342/162 |
| 5,359,333 A | 10/1994 | Withers, Jr. | 342/378 |
| 6,044,083 A | 3/2000 | Citta et al. | 370/441 |
| 6,070,079 A | 5/2000 | Kuwahara | 455/456 |
| 6,185,258 B1 | 2/2001 | Alamouti et al. | 375/260 |
| 6,891,897 B1 | 5/2005 | Bevan et al. | 375/265 |
| 6,907,270 B1* | 6/2005 | Blanz | 455/562.1 |
| 7,006,848 B1* | 2/2006 | Ling et al. | 455/562.1 |
| 2001/0033622 A1* | 10/2001 | Jongren et al. | 375/267 |
| 2002/0136327 A1* | 9/2002 | El-Gamal et al. | 375/308 |
| 2003/0026349 A1* | 2/2003 | Onggosanusi et al. | 375/267 |
| 2003/0048857 A1* | 3/2003 | Onggosanusi et al. | 375/267 |
| 2003/0063654 A1* | 4/2003 | Onggosanusi et al. | 375/130 |
| 2003/0073464 A1* | 4/2003 | Giannakis et al. | 455/562 |
| 2003/0125040 A1* | 7/2003 | Walton et al. | 455/454 |
| 2003/0161412 A1* | 8/2003 | Niida et al. | 375/299 |
| 2003/0210750 A1* | 11/2003 | Onggosanusi et al. | 375/295 |
| 2004/0002364 A1* | 1/2004 | Trikkonen et al. | 455/562.1 |

OTHER PUBLICATIONS

Jack Salz, et al, "Effect of Fading Correlation on Adaptive Arrays in Digital Mobile Radio", *IEEE Transactions on Vehicular Technology*, vol. 43, No. 4, (Nov. 1994), pp. 1049-1957.

(Continued)

*Primary Examiner*—Simon Nguyen

(57) ABSTRACT

A method is provided of transmitting signals from two or more antennas in a wireless telecommunications network, in which at least one data sequence is space-time block encoded. Before transmitting the data sequence, a linear transformation is applied to the data sequence, the linear transformation being adapted to use knowledge of correlation among the antennas to at least partially compensate the transmitted signals for said correlation. The linear transformation depends on the eigenvalues of an antenna correlation matrix. The linear transformation further depends on a ratio of symbol energy ($E_S$) to noise variance ($\sigma^2$). The method includes transmitting the encoded and transformed data sequence.

8 Claims, 4 Drawing Sheets

OTHER PUBLICATIONS

Da-Shan Shiu, et al, "Fading Correlation and Its Effect on the Capacity of Multielement Antenna Systems", *IEEE Transactions on Communications*, vol. 48, No. 3, (Mar. 2000), pp. 502-513.

Helmut Bolcskei, et al, "Performance of Space-Time Codes in the Presence of Spatial Fading Correlation", *IEEE 2000*, pp. 687-693.

Angeliki Alexiou, "Realistic Channel Model Considerations in UMTS Downlink Capacity with Space-Time Block Coding", 3rd *IEEE Signal Processing Workshop on Signal Processing Advances in Wireless Communications*, Taoyuan, Taiwan, (3/23-23/01), pp. 275-278.

Christopher Brunner, et al, "Downlink Eigenbeamforming in WCDMA", *Munich University of Technology*, D-80290 Munich, Germany.

Hemanth Sampath, et al, "Linear Precoding for Space-Time Coded Systems With Known Fading Correlations", *IEEE Communications Letters*, vol. 6, No. 6, (Jun. 2002), pp. 239-241.

Vahid Tarokh, et al, "Space-Time Block Codes from Orthogonal Designs", *IEEE Transactions on Information Theory*, vol. 45, No. 5, (Jul. 1999), pp. 1456-1467.

Louay M.A. Jalloul, et al, "Performance Analysis of CDMA Transmit Diversity Methods", IEEE 1999, pp. 1326-1330.

\* cited by examiner

METHOD OF COMPENSATING FOR CORRELATION BETWEEN MULTIPLE ANTENNAS

CROSS-REFERENCE TO RELATED APPLICATION

This is a continuation-in-part application of application Ser. No. 10/392,935, filed on Mar. 20, 2003.

FIELD OF THE INVENTION

The present invention relates to telecommunications, and more particularly, wireless communication.

DESCRIPTION OF THE RELATED ART

Base station antennas are often placed high above ground and relatively close to each other. There may be no obstructions between them acting to scatter transmitted symbols, leading to high antenna correlation. It has been shown that such correlations reduce channel capacity and system performance in multiple-input multiple-output ("MIMO") systems.

Specifically, performance degradation due to antenna correlation may be prevented by increasing the spacing of antennas. However, it has been found that in situations where the angular spread of radio waves reaching an antenna is relatively small or where there are no line of sight obstructions between antennas, antenna correlation may be high (e.g., taking a value close to one) even when the antennas are well-separated.

Accordingly, those skilled in the art have recognised that antenna correlations tend to degrade the performance of MIMO systems.

SUMMARY OF THE INVENTION

The present invention provides for a method of linear transformation for a space-time coded system, which may alter transmitted signals to at least partially compensate for antenna correlation. The linear transformation may be realized by a precoder, for example, which combats the detrimental effects of antenna correlation by exploiting knowledge of antenna correlation made available to the transmitter.

In one example of the present invention, a method is provided for transmitting signals from three or more antennas in a wireless telecommunications network, in which at least one data sequence may be space-time block encoded. Before transmitting the data sequence, a linear transformation may be applied to the data sequence, the linear transformation being dependent upon knowledge of correlation among the antennas to at least partially compensate the transmitted signals for said correlation. The linear transformation may depend on the eigenvalues of an antenna correlation matrix. The linear transformation may also depend on a ratio of symbol energy ($E_s$) to noise variance ($\sigma^2$). The method may includes transmitting the encoded and transformed data sequence.

BRIEF DESCRIPTION OF THE DRAWINGS

The present invention will be better understood from reading the following description of non-limiting embodiments, with reference to the attached drawings, wherein below.

Figure 1:
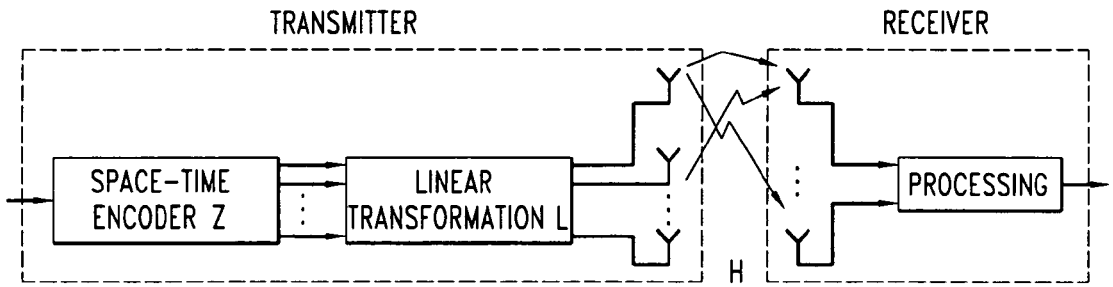
FIG. 1 is a diagram illustrating a MIMO telecommunications system.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

For ease of understanding a more general description is presented, followed by an explanation of implementation aspects in a mobile telecommunications network, such as a Universal Mobile Telecommunications System ("UMTS") standards based type. It should be noted that the present invention has applications not only in UMTS, but also, by way of example and without limitation, in communication systems such as, for example, code division multiple access ("CDMA") and wideband code division multiple access ("W-CDMA").

MIMO systems for use in UMTS, for example, typically involve space-time block encoding. The encoding and transmission sequence for this scheme may be as follows: at a first transmission time instant $t_1$ symbols $x_1$ and $x_2$ may be transmitted from antennas 1 and 2 respectively and at the next transmission instant $t_2$ symbols $-x_2^*$ and $x_1^*$ may be transmitted from antennas 1 and 2 respectively, where * denotes complex conjugate. This transmission sequence Z can be represented in matrix form as $$\begin{bmatrix} x_1 & x_2 \\ -x_2^* & x_1^* \end{bmatrix}.$$

In the case of four antennas in the above space-time block encoding scheme, the transmission sequence Z may be represented in matrix form as $$Z = \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{bmatrix}$$

It should be noted that the performance of MIMO systems can sometimes be improved by preceding. Precoding may be defined to means applying a linear transformation to symbols. This precoder may be a function of both the matrices of eigenvectors and eigenvalues of the antenna correlation matrix R. Specifically, the optimal precoder L, which may be optimal in the sense that the average Pairwise Error Probability ("PEP") between two codewords is minimized, may beproved as follows:

$$L = V_r \Phi_f V_e^H \quad \text{(Equation 1)}$$

where $R^{1/2} = U_r \Lambda_r V_r$, with $U_r$ and $V_r$ being the matrices of eigenvectors of the matrix $R^{1/2}$ and $\Lambda_r$ being the matrix of eigenvalues of $R^{1/2}$. R is the antenna correlation matrix. $\Phi_f^2 = (\gamma I - \Lambda_r^{-2} \Lambda_e^{-2})_+$, with I being the identity matrix, and $EE^H = U_e \Lambda_e V_e$, E being the matrix of the minimum distance of the code, with $U_e$ and $V_e$ being the matrices of eigenvectors of $EE^H$ and $\Lambda_e$ being the matrix of eigenvalues of $EE^H$. $\gamma > 0$ is a constant that is computed from the transmit power and (·)+ denotes that the expression in the parenthesis takes its actual computed value if positive else is set to zero if negative.

A linear precoder that exploits knowledge of antenna correlation may be included in a space-time coded MIMO system so as to enhance performance. Let us consider a multiple-input multiple output ("MIMO") telecommunications network consisting of M transmit antennas and N receive antennas, as shown in FIG. 1. The transmitter, for example a base station for mobile telecommunications, has some knowledge about the channel, namely the antenna correlation matrix R. There is a channel matrix H, which describes the physical characteristics of the propagation channel. More specifically, each entry $h_{ji}$ of the N×M channel matrix H represents the channel response between transmit antenna i and receive antenna j. The space-time encoder of the transmitter maps the input data sequence $x = (x_1, x_2, \ldots x_Q)$ to be transmitted into an M×Q matrix Z of codewords, that are split on a set of M parallel sequences. I.e., each of the M rows of the matrix Z represents one of Q distinct codewords. These codewords are then transformed by a M×M linear transformation denoted L in order to adapt the code to the available antenna correlation information. The resulting sequences, which are represented by rows of a new transformed M×Q matrix C=LZ, are sent from the M transmit antennas over Q time intervals.

The receive signal (at the mobile) is assumed to be a linear combination of several multipaths reflected from local scatterers, which result in uncorrelated fading across the receive antennas and therefore uncorrelated rows of matrix H. However, limited scattering at the transmitter (e.g. a base station), can result in antenna correlation and hence correlated columns of channel matrix H. A correlation among the M transmit antennas may be described by the M×M matrix R, referred to as the (transmit) antenna correlation matrix. The signal received by the N receive antennas over Q time periods may be represented by an N×Q matrix Y. The received signal included in the matrix Y may then be a superposition of M transmitted sequences corrupted by an additive white Gaussian noise characterised by the N×Q matrix $\Sigma$ and with covariance matrix equal to $\sigma^2 I_N$:

$$Y = HC + \Sigma = HLZ + \Sigma \quad \text{(Equation 2)}$$

The linear transformation L may be determined so as to minimise a given criterion, namely an upper bound on the pairwise error probability (PEP) of a codeword. The determination of L, as described here, assumes for mathematical simplification that the transmitter possesses perfect knowledge of the antenna correlation matrix. This precoder L is a function of both the matrices of eigenvectors and eigenvalues of the antenna correlation matrix. Specifically, the optimal precoder L, which minimizes the average PEP is:

$$L = V_r \Phi_f V_e^H \quad \text{(Equation 3)}$$

where $R^{1/2} = U_r \Lambda_r V_r$, with $U_r$ and $V_r$ being the matrices of eigenvectors of the correlation matrix $R^{1/2}$ and $\Lambda_r$ being the matrix of eigenvalues of $R^{1/2}$. R is the antenna correlation matrix.

$$\Phi_f^2 = \left(\gamma I - \left(\frac{E_s}{\sigma^2}\right)^{-1} \Lambda_r^{-2} \Lambda_e^{-2}\right)_+,$$

with I being the identity matrix and $EE^H = U_e \Lambda_e V_e$, where $$E = \arg\min_{\tilde{E}(k,l,t)} \det\left[\tilde{E}(k,l,t)\tilde{E}^H(k,l,t)\right]$$

is the matrix of the minimum distance of the code, with $U_e$ and $V_e$ being the matrices of eigenvectors of $EE^H$ and $\Lambda_e$ the matrix of eigenvalues of $EE^H$. Also, $\gamma > 0$ is a constant that is computed from the transmit power $P_O$ and (·)+ denotes that the expression in the parenthesis takes its actual computed values if positive else is set to zero if negative. It will be seen that there is an additional term $$\left(\frac{E_s}{\sigma^2}\right)^{-1},$$

where $E_S$ is the symbol energy and $\sigma^2$ is the noise variance. This term was included so as to account for Signal-to-Noise Ratio, which is $E_S/\sigma^2$.

Since an orthogonal space-time code is considered, $EE^H = \zeta I$, where $\zeta$ is a scalar, $\Lambda_e = \zeta I$ and $V_e = I$. This gives rise to the following equation:

$$L = V_r \Phi_f \quad \text{(Equation 4)}.$$

Application to an M Antenna Transmission System

Considering the general case of m transmit antennas, the next step may be to apply both the linear precoder L given in Equation (4) and any orthogonal space-time block coding Z to Equation (2). $\Lambda_e = I$ and $V_e = I$. $V_r$ and $\Phi_f^2$ coincide with the matrix with the eigenvectors and eigenvalues of $LL^H$ respectively. Without loss of generality we assume that the transmit power Po, equal to the trace of $LL^H$, may be 1. With $\lambda_{r,1}, \lambda_{r,2}, \ldots, \lambda_{r,M}$ being the eigenvalues of matrix $R^{1/2}$ where $\lambda_{r,1} \geq \lambda_{r,2} \geq \ldots \geq \lambda_{r,M}$ and $W_1, W_2, \ldots, W_M$ being the corresponding eigenvectors of the matrix $R_T^{1/2}$, the linear precoder is characterised as follows:

1) When the antenna correlation is less than one, $\lambda_{r,1}, \lambda_{r,2}, \ldots, \lambda_{r,M} \neq 0$ and $$\beta_i = \left[\left(\frac{1}{\lambda_{r,1}^2} - \frac{1}{\lambda_{r,i}^2}\right) + \left(\frac{1}{\lambda_{r,2}^2} - \frac{1}{\lambda_{r,i}^2}\right) + \ldots + \left(\frac{1}{\lambda_{r,M}^2} - \frac{1}{\lambda_{r,i}^2}\right)\right] /$$

$$\left(\frac{E_S}{\sigma^2}\right) \geq -1, i = 1, 2, \ldots, M,$$

the precoder matrix may be:

$$L = \frac{1}{\sqrt{M}}[w_1 w_2 \ldots w_M]\begin{bmatrix} \sqrt{1+\beta_1} & 0 & 0 & \ldots & 0 \\ 0 & \sqrt{1+\beta_2} & 0 & \ldots & 0 \\ 0 & 0 & \ddots & 0 & \vdots \\ \vdots & \vdots & 0 & \ddots & 0 \\ 0 & 0 & \ldots & 0 & \sqrt{1+\beta_M} \end{bmatrix} \quad \text{(Equation 5)}$$

2) When the antenna correlation is zero, the eigenvalues of the matrix $R^{1/2}$ are equal and therefore $\beta_i=0$, for $i=1,2,\ldots,M$. Also, the matrix of the eigenvectors equals the identity matrix. In this case the precoder may be equivalent to the orthogonal space-time coding.

3) When the antenna correlation is one, only one eigenvalue of matrix $R_T^{1/2}$ is non zero. In this case the precoder is equivalent to a beamformer.

Application to a Two-Antenna Transmission System

Looking at the particular case of two transmit antennas, the linear precoder L of Equation (4) and the matrix of codewords for Alamouti space-time block coding, namely $$Z = \begin{bmatrix} x_1 & x_2 \\ -x_2^* & x_1^* \end{bmatrix}$$

are applied to Equation (2).

For power $P_O=1$, where $\lambda_{r,1}, \lambda_{r,2}$ are the eigenvalues and $w_1$, $w_2$ are the eigenvectors of the matrix $R^{1/2}$, the linear precoder is characterised as follows:

1) When the antenna correlation is less than one, $\lambda_{r,1}, \lambda_{r,2} \neq 0$ and $$\beta = \left(\frac{1}{\lambda_{r,2}^2} - \frac{1}{\lambda_{r,1}^2}\right) \bigg/ \left(\frac{E_S}{\sigma^2}\right) \leq 1,$$

the precoder can be written as:

$$L = \begin{bmatrix} w_1 & w_2^* \\ w_2 & -w_1^* \end{bmatrix}\begin{bmatrix} \sqrt{(1+\beta)/2} & 0 \\ 0 & \sqrt{(1-\beta)/2} \end{bmatrix} \quad \text{(Equation 6)}$$

with $V_r = \begin{bmatrix} w_1 & w_2^* \\ w_2 & -w_1^* \end{bmatrix}$ and $\Phi_f = \begin{bmatrix} \sqrt{(1+\beta)/2} & 0 \\ 0 & \sqrt{(1-\beta)/2} \end{bmatrix}$ 2) When the antenna correlation is zero, the eigenvalues of the matrix $R^{1/2}$ are equal and therefore $\beta=0$. In this case the precoder becomes $$L = \frac{1}{\sqrt{2}}\begin{bmatrix} w_1 & w_2^* \\ w_2 & -w_1^* \end{bmatrix}$$

which is equivalent to the Alamouti orthogonal space-time coding.

3) When the antenna correlation is one, one eigenvalue of matrix $R^{1/2}$ is zero resulting in a matrix $\Phi_f$ with all elements but one equal to zero. In this case the precoder becomes $$L = \begin{bmatrix} w_1 & 0 \\ w_2 & 0 \end{bmatrix},$$

which is equivalent to a beamformer.

The proposed reconfigurable scheme may thus be equivalent to orthogonal space-time block coding for antenna correlation equal to zero, and to beamforming for antenna correlation equal to one. For intermediate antenna correlation values it performs well and may be robust to antenna correlation variations.

The Decoder In a Two-Antenna Transmission System

The space-time decoder at the receiver is similar to the one used with Space-Time Block Codes, except that the linear transformation matrix L may be taken into account. The received signal described in Equation (2) can be seen as $Y=[y_1 \; y_2]=H_{eq}Z+\Sigma=HLZ+\Sigma$, where $H_{eq}=[h_{eq,1} \; h_{eq,2}]=HL$. The space-time block decoder for the proposed approach can then be seen as identical with the conventional one under the assumption that the effective channel is now $H_{eq}$. Hence, to recover the transmitted signals $x_1$ and $x_2$, the following operations are realized:

$$\hat{x}_1 = (h_{eq,1})^* y_1 - h_{eq,2}(y_2)^*$$

$$\hat{x}_2 = (h_{eq,2})^* y_1 + h_{eq,1}(y_2)^*$$

It will be seen that knowledge of the equivalent channel $H_{eq}$ (or its estimate) may be required at the receiver in order to recover the transmitted signals $x_1$ and $x_2$.

Two-Antenna Transmission System Implementation In UMTS

Figure 2:
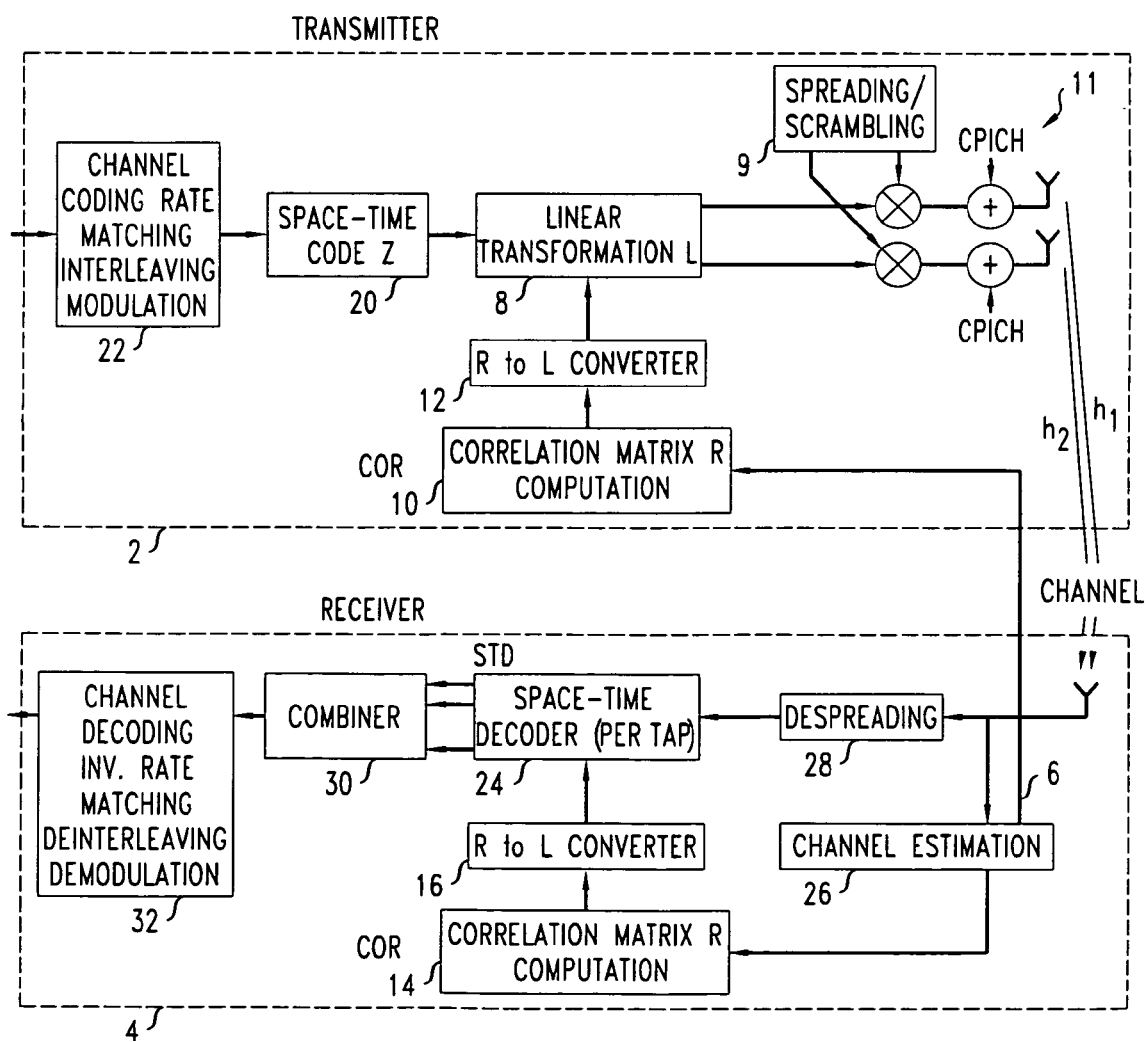
FIG. 2 is a diagram illustrating a UMTS transmitter and receiver.

A UMTS transmitter 2 and receiver 4 are shown in FIG. 2. The UMTS frequency division duplex ("FDD") downlink transmission-reception scheme includes antenna correlation dependent linear precoding as explained above. The transmitter 2 has some knowledge about the channel, namely the antenna correlation matrix R. In a UMTS network operating FDD downlink (e.g., from base station to mobile station), the antenna correlation information is obtained as feedback channel estimates 6 provided as bits sent by receiver 4 (e.g., the mobile station). The relevant modules may be, at the transmitter, a linear precoder (L) 8, a processor (COR,10) which determines the antenna correlation matrix (R), and an R to L converter 12. The relevant modules at the receiver may be a processor (COR,14) which determines the antenna correlation matrix (R), an R to L converter 16, and a space-time decoder 18.

At the transmitter 2, the linear precoder (L) 8 is applied to the space-time encoded symbols provided from a space-time block encoder 20 after channel coding, rate matching interleaving, and modulation (shown as functional clock 22) in known fashion. The linear precoder L coefficients may be computed based on the antenna correlation matrix R in the R to L converter 12. The computation of R (in a functional block denoted COR,10) may be based on channel estimates 6 fed back from the receiver 4. It may be performed by averaging over time-sequential channel estimates (running average) using a forgetting factor. The forgetting factor aims to weight the contribution of each new channel estimate as compared to the past channel estimates. It will thus be seen that fast fading may be not tracked but only slowly varying antenna correlations. This information may be fed back to the transmitter using a low-rate feedback link, as available in UMTS. In a UMTS uplink channel there may be a number of bits available for communicating information to the transmitter about the received signal. The outputs of the linear precoder 8 may be spread/scrambled 9 and subject to addition of Common Pilot Channel (CPICH) coding 11 bits before transmission.

At the receiver 4, received signals may be used to provide channel estimates in a channel estimation block 26 so as to be used to compute the antenna correlation matrix R in processor 14 (as at the transmitter). The signals may be also despread 28 and applied to a space-time block decoder 24. At the receiver 4 the space-time block decoder (STD,24) has essentially the same structure as a conventional one, but needs to consider instead of the channel estimates, the equivalent channel, defined as the linear transformation of the channel according to the coefficients of L, that is $H_{eq} = [h_{eq,1} \ h_{eq,2}] = HL$. As shown in FIG. 2, the linear precoder L coefficients are estimated at the receiver from the processor (COR,14) which determines the antenna correlation matrix (R) and the R to L converter 16 present at the receiver 4. The outputs of the space-time decoder 24 may be provided to a combiner 30 and then channel decoded, inverse rate matched, deinterleaved and demodulated in known fashion (shown in FIG. 2 as functional block 32).

Alternative Two-antenna Transmission System Implementation in UMTS

An alternative implementation is now described, in which instead of the linear transformation matrix L being determined at the transmitter from channel estimates provided by the receiver, the coefficients of linear transformation matrix L are provided by the receiver.

Figure 3:
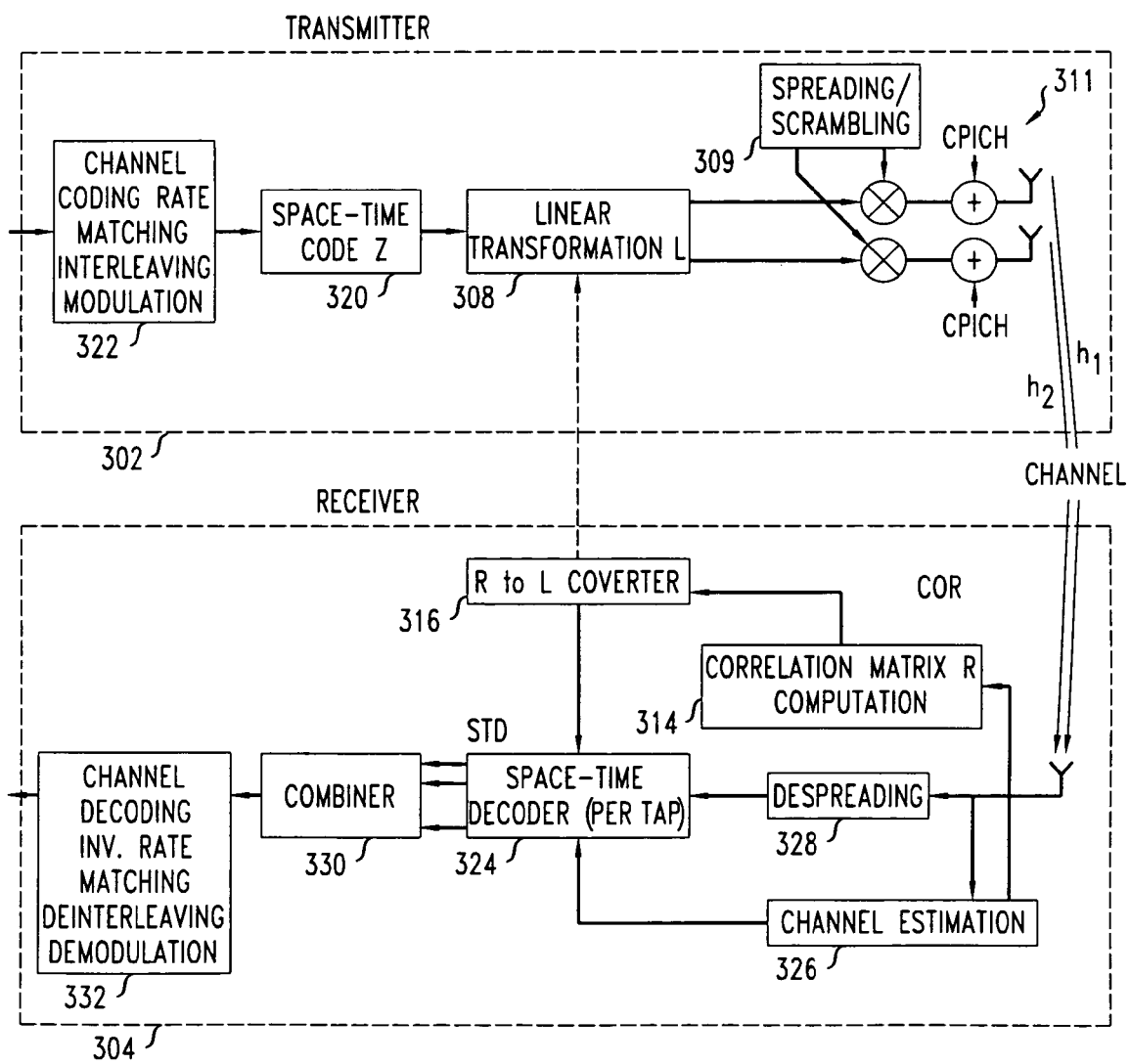
FIG. 3 is a diagram illustrating an alternative UMTS transmitter and receiver.

In this alternative embodiment, which is shown in FIG. 3, the transmitter 302 is given the coefficients of the precoder L by the receiver 304. In this UMTS transmitter 302 and receiver 304 operating with frequency division duplex (FDD) downlink, these coefficients are feedback bits sent by the mobile station. The proposed UMTS network is depicted in FIG. 3, where the UMTS FDD downlink transmission-reception scheme includes antenna correlation dependent linear precoding as explained previously. The relevant module at the transmitter is a linear precoder (L) 308. The relevant modules at the receiver are a processor (COR,314) which determines the antenna correlation matrix (R), an R to L converter 316, and a space-time decoder 324.

At the transmitter, the linear precoder (L) may be applied to the space-time encoded symbols provided from the space-time block encoder 320 after channel coding, rate matching, interleaving, and modulation (shown as functional block 322) in known fashion. The outputs from the linear precoder 308 may be spread/scrambled 309 and subject to the addition of Common Pilot Channel (CPICH) 311 bits before transmission. The linear precoder L coefficients may be provided by the receiver 304 as explained below and fed back over air to the transmitter.

At the receiver, the computation of R (in a functional block denoted COR 314) may be based on channel estimates provided from the channel estimator block 326. It may be performed by averaging over time sequential channel estimates (running average) using a forgetting factor. The forgetting factor aims to weight the contribution of each new channel estimate as compared to the past channel estimates; the aim being to take account of slowly-varying antenna correlations but not fast fading. The linear precoder (L) coefficients may be computed based on the antenna correlation matrix R in the R to L converter 316.

At the receiver 304, received signals may be both used to provide channel estimates in a channel estimation block 326, and may be also despread 328 and applied to a space-time decoder 324. At the receiver, the space-time block decoder (STD) 324 may have identical structure to the conventional one, but needs to consider instead of the channel estimates, the equivalent channel, defined as the linear transformation of the channel according to the coefficients of L, that is $H_{eq} = [h_{eq,1} \ h_{eq,2}] = HL$. The outputs of the space-time decoder may be provided to a combiner 330 and then channel decoded, inverse rate matched, deinterleaved and demodulated in known fashion (shown in FIG. 3 as functional block 332).

Application to a Four-antenna Transmission System

Turning now to consider the 4 transmit antenna case, the linear precoder given back in Equation (3) and the matrix of codewords for Tarokh space-time block coding for the 4 transmit antenna case, namely $$Z = \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{bmatrix},$$

are applied to Equation (2)

1) When the antenna correlation may be less than one, $\lambda_{r,1}, \lambda_{r,2}, \lambda_{r,3}, \lambda_{r,4} \neq 0$ and $\beta_i = \geq -1, i=1,2,3,4$, with $$\beta_1 = \left[\left(\frac{1}{\lambda_{r,2}^2} - \frac{1}{\lambda_{r,1}^2}\right) + \left(\frac{1}{\lambda_{r,3}^2} - \frac{1}{\lambda_{r,1}^2}\right) + \left(\frac{1}{\lambda_{r,4}^2} - \frac{1}{\lambda_{r,1}^2}\right)\right] / \left(\frac{E_S}{\sigma^2}\right) \quad (7)$$

$$\beta_2 = \left[\left(\frac{1}{\lambda_{r,1}^2} - \frac{1}{\lambda_{r,2}^2}\right) + \left(\frac{1}{\lambda_{r,3}^2} - \frac{1}{\lambda_{r,2}^2}\right) + \left(\frac{1}{\lambda_{r,4}^2} - \frac{1}{\lambda_{r,2}^2}\right)\right] / \left(\frac{E_S}{\sigma^2}\right) \quad (8)$$

$$\beta_3 = \left[\left(\frac{1}{\lambda_{r,1}^2} - \frac{1}{\lambda_{r,3}^2}\right) + \left(\frac{1}{\lambda_{r,2}^2} - \frac{1}{\lambda_{r,3}^2}\right) + \left(\frac{1}{\lambda_{r,4}^2} - \frac{1}{\lambda_{r,3}^2}\right)\right] / \left(\frac{E_S}{\sigma^2}\right) \quad (9)$$

$$\beta_4 = \left[\left(\frac{1}{\lambda_{r,1}^2} - \frac{1}{\lambda_{r,4}^2}\right) + \left(\frac{1}{\lambda_{r,2}^2} - \frac{1}{\lambda_{r,4}^2}\right) + \left(\frac{1}{\lambda_{r,3}^2} - \frac{1}{\lambda_{r,4}^2}\right)\right] / \left(\frac{E_S}{\sigma^2}\right) \quad (10)$$

the precoder may be written as:

$$L = \frac{1}{\sqrt{4}}[w_1 w_2 w_3 w_4]\begin{bmatrix} \sqrt{1+\beta_1} & 0 & 0 & 0 \\ 0 & \sqrt{1+\beta_2} & 0 & 0 \\ 0 & 0 & \sqrt{1+\beta_3} & 0 \\ 0 & 0 & 0 & \sqrt{1+\beta_4} \end{bmatrix} \quad (11)$$

2) When the antenna correlation is zero, the eigenvalues of the matrix $R_T^{1/2}$ are equal and therefore $\beta_i=0$, i=1,2,3,4 and the matrix of the eigenvectors equals the identity matrix. In this case the precoder is equivalent to the Tarokh orthogonal space-time coding.

3) When the antenna correlation is one, only one eigenvalue of matrix $R_T^{1/2}$ is non zero. In this case the precoder is equivalent to a beamformer.

The Decoder In a Four Antenna Transmission System

The receiver is similar to the one used for the Tarokh space-time block coding scheme except it takes into account the linear transformation matrix L.

Four-antenna Transmission System Implementation In UMTS

Figure 4:
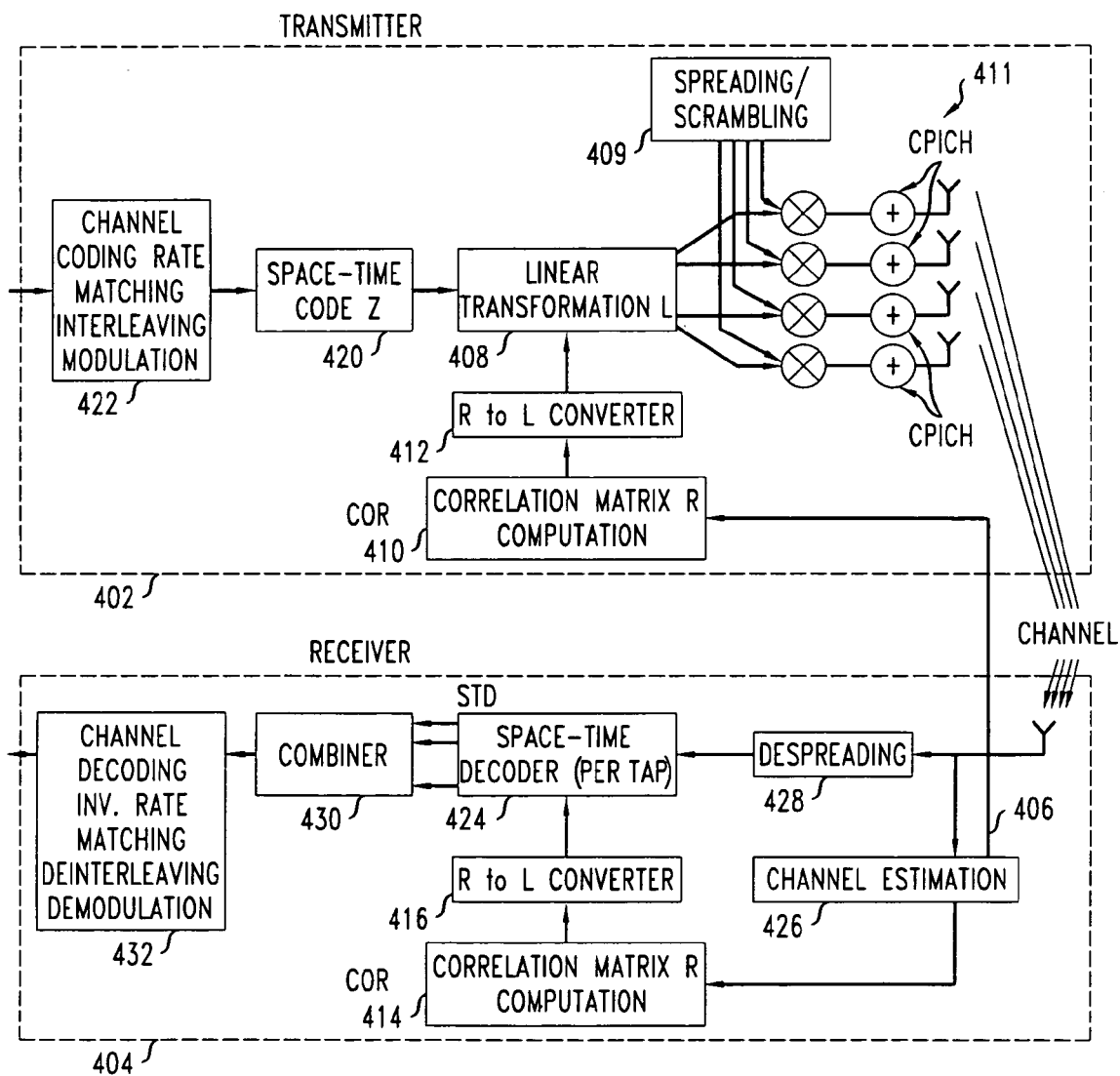
FIG. 4 is a diagram illustrating a further UMTS transmitter and receiver.

A UMTS transmitter 402 and receiver 404 are shown in FIG. 4. The UMTS frequency division duplex (FDD) downlink transmission-reception scheme includes antenna correlation dependent linear preceding as explained above. The transmitter 402 has some knowledge about the channel, namely the antenna correlation matrix R. In a UMTS network operating FDD downlink (e.g., from base station to mobile station), the antenna correlation information is obtained as feedback channel estimates 406 provided as bits sent by receiver 404 (e.g., the mobile station). The relevant modules are, at the transmitter, a linear precoder (L) 408, a processor (COR,410) which determines the antenna correlation matrix (R), and an R to L converter 412. The relevant modules at the receiver are a processor (COR,414) which determines the antenna correlation matrix (R), an R to L converter 416, and a space-time decoder 418.

At the transmitter 2, the linear precoder (L) 408 may be applied to the space-time encoded symbols provided from a space-time block encoder 420 after channel coding, rate matching interleaving, and modulation (shown as functional clock 422) in known fashion. The linear precoder L coefficients are computed based on the antenna correlation matrix R in the R to L converter 412. The computation of R (in a functional block denoted COR,410) may be based on channel estimates 406 fed back from the receiver 404. It may be performed by averaging over time-sequential channel estimates (running average) using a forgetting factor. The forgetting factor aims to weight the contribution of each new channel estimate as compared to the past channel estimates. It will thus be seen that fast fading may not be tracked but only slowly varying antenna correlations. This information may be fed back to the transmitter using a low-rate feedback link, as available in UMTS. In a UMTS uplink channel there may be a number of bits available for communicating information to the transmitter about the received signal. The outputs of the linear precoder 408 are spread/scrambled 409 and subject to addition of Common Pilot Channel (CPICH) coding 411 bits before transmission.

At the receiver 404, received signals may be used to provide channel estimates in a channel estimation block 426 so as to be used to compute the antenna correlation matrix R in processor 414 (as at the transmitter). The signals may be also despread 428 and applied to a space-time block decoder 424. At the receiver 404 the space-time block decoder (STD,424) has essentially the same structure as a conventional one, but needs to consider instead of the channel estimates, the equivalent channel, defined as the linear transformation of the channel according to the coefficients of L, that is $H_{eq}=[h_{eq,1}\ h_{eq,2}\ h_{eq,3}\ h_{eq,4}]=HL$. As shown in FIG. 2, the linear precoder L coefficients are estimated at the receiver from the processor (COR,414) which determines the antenna correlation matrix (R) and the R to L converter 416 present at the receiver 414. The outputs of the space-time decoder 424 may be provided to a combiner 430 and then channel decoded, inverse rate matched, deinterleaved and demodulated in known fashion (shown in FIG. 4 as functional block 432).

Alternative Four-antenna Transmission System Implementation in UMTS

An alternative implementation is now described, in which instead of the linear transformation matrix L being determined at the transmitter from channel estimates provided by the receiver, the coefficients of linear transformation matrix L are provided by the receiver.

Figure 5:
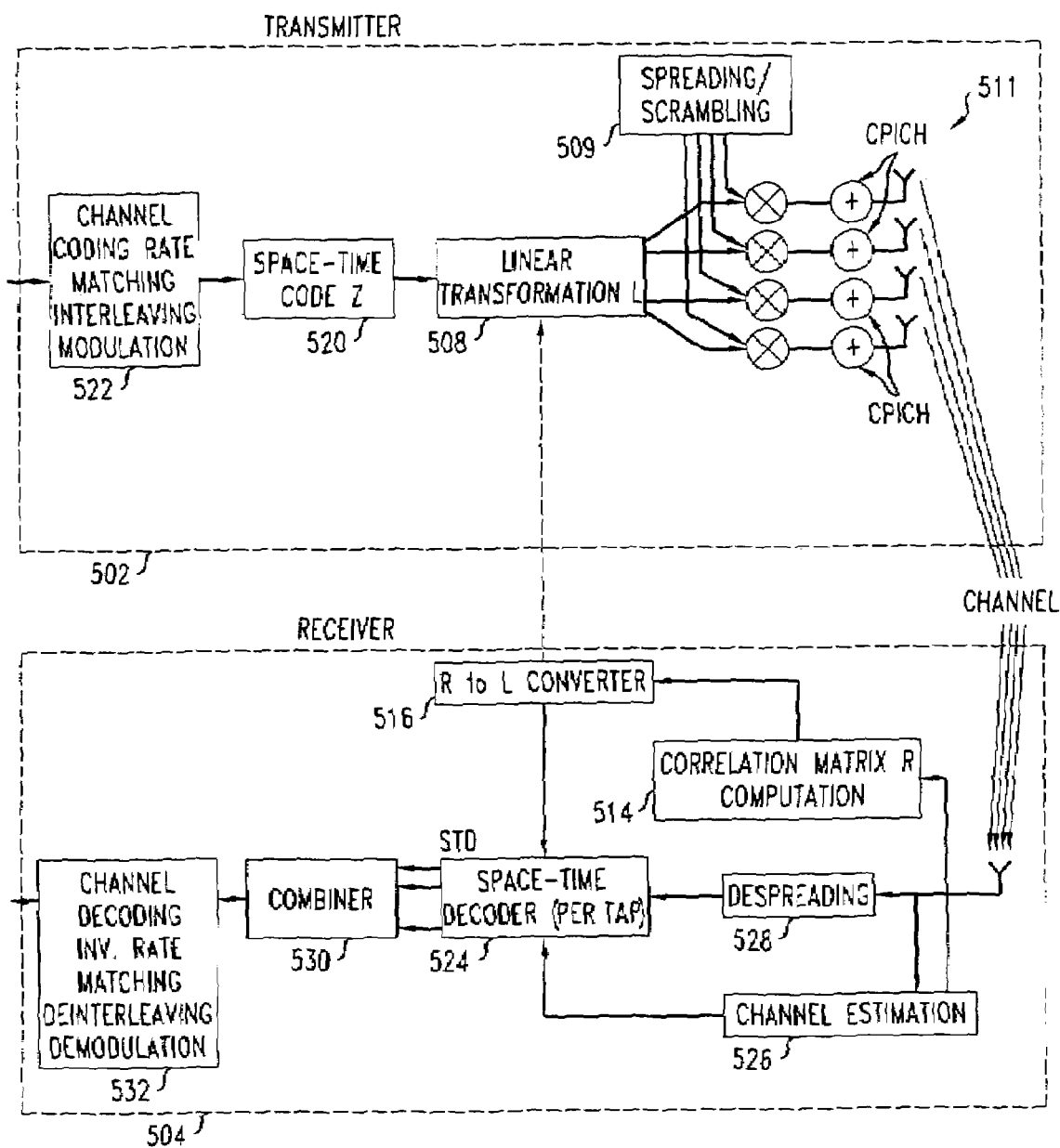
FIG. 5 is a diagram illustrating a yet further UMTS transmitter and receiver.

In this alternative embodiment, which is shown in FIG. 5, the transmitter 502 may be given the coefficients of the precoder L by the receiver 504. In this UMTS transmitter 502 and receiver 504 operating with frequency division duplex (FDD) downlink, these coefficients are feedback bits sent by the mobile station. The proposed UMTS network is depicted in FIG. 5, where the UMTS FDD downlink transmission-reception scheme includes antenna correlation dependent linear preceding as explained previously. The relevant module at the transmitter is a linear precoder (L) 508. The relevant modules at the receiver are a processor (COR,514) which determines the antenna correlation matrix (R), an R to L converter 516, and a space-time decoder 524.

At the transmitter, the linear precoder (L) may be applied to the space-time encoded symbols provided from the space-time block encoder 520 after channel coding, rate matching, interleaving, and modulation (shown as functional block 522) in known fashion. The outputs from the linear precoder 508 may be spread/scrambled 509 and subject to the addition of Common Pilot Channel (CPICH) 511 bits before transmission. The linear precoder L coefficients may be provided by the receiver 504 as explained below and fed back over air to the transmitter.

At the receiver, the computation of R (in a functional block denoted COR 514) is based on channel estimates provided from the channel estimator block 526. It may be performed by averaging over time sequential channel estimates (running average) using a forgetting factor. The forgetting factor aims to weight the contribution of each new channel estimate as compared to the past channel estimates; the aim being to take account of slowly-varying antenna correlations but not fast fading. The linear precoder (L) coefficients are computed based on the antenna correlation matrix R in the R to L converter 516.

At the receiver 504, received signals may be both used to provide channel estimates in a channel estimation block 526, and may be also despread 528 and applied to a space-time decoder 524. At the receiver, the space-time block decoder (STD) 524 has identical structure to the conventional one, but needs to consider instead of the channel estimates, the equivalent channel, defined as the linear transformation of the channel according to the coefficients of L, that may be $H_{eq}=[h_{eq,1}\ h_{eq,2}\ h_{eq,3}\ h_{eq,4}]=HL$. The outputs of the space-time decoder may be provided to a combiner 530 and then channel decoded, inverse rate matched, deinterleaved and demodulated in known fashion (shown in FIG. 5 as functional block 532).

General

The two transmit antenna case and four transmit antenna case are examples. The approach extends to the cases in which there are three, or five or more transmit antennas.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as network elements, the wireless unit, the base station, a base station controller, a mobile switching center and/or a radar system. Moreover, processing circuitry required to implement and use the described system may be implemented in application specific integrated circuits, software-driven processing circuitry, firmware, programmable logic devices, hardware, discrete components or arrangements or the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of transmitting signals from a transmitter comprising three or more antennas in a wireless telecommunications network, comprising:
    space-time block encoding at least one data sequence;
    applying to the data sequence a linear transformation dependent upon knowledge of correlation among the antennas to at least partially compensate the transmitted signals for said correlation, wherein the linear transformation depends on the eigenvalues of an antenna correlation matrix and a ratio of symbol energy to noise variance; and
    transmitting the encoded and transformed data sequence;
    wherein the linear transformation further depends on the eigenvectors of the antenna correlation matrix;
    wherein:
    the transmitter has M antennas where M is an integer greater than two, the channel correlation matrix has M eigenvalues, denoted $\lambda_{r,1} \lambda_{r,2}, \ldots, \lambda_{r,M}$,
    $E_s/\sigma^2$ is a ratio of symbol energy to noise variance;
    the method further comprises calculating values of parameters $$\beta_i = \left[\left(\frac{1}{\lambda_{r,1}^2} - \frac{1}{\lambda_{r,i}^2}\right) + \left(\frac{1}{\lambda_{r,2}^2} - \frac{1}{\lambda_{r,i}^2}\right) + \ldots + \left(\frac{1}{\lambda_{r,M}^2} - \frac{1}{\lambda_{r,i}^2}\right)\right] / \left(\frac{E_s}{\sigma^2}\right), i = 1, 2, \ldots, M,$$

and
    the linear transformation is determined from these values and from the eigenvectors $(w_1, w_2, w_3, \ldots w_M)$ of the antenna correlation matrix.

2. The method of claim 1, wherein the linear transformation is applied prior to block encoding the data sequence.

3. The method of claim 1, wherein the linear transformation is applied after block encoding the data sequence.

4. The method of claim 1, wherein:

$$L = \frac{1}{\sqrt{M}} [w_1 w_2 \ldots w_M] \begin{bmatrix} \sqrt{1+\beta_1} & 0 & 0 & L & 0 \\ 0 & \sqrt{1+\beta_2} & 0 & L & 0 \\ 0 & 0 & O & 0 & M \\ M & M & 0 & O & 0 \\ 0 & 0 & L & 0 & \sqrt{1+\beta_M} \end{bmatrix}$$

5. A transmitter for wireless telecommunications comprising a space time block encoder, and a linear transformation apparatus operative to transform the data sequence from or to a space-time block encoder to at least partially compensate for correlation between antennas, and the transmitter comprising three or more antennas operative to transmit the encoded and transformed data sequence, the linear transformation apparatus comprising:
    a first processor operative to determine an antenna correlation matrix (R); and
    a second processor operative to:
        determine the eigenvalues of the antenna correlation matrix;
        determine the ratio of symbol energy to noise variance; and,
        determine a linear transformation matrix (L) to be applied dependent upon the elgenvalues and on a ratio of symbol energy to noise variance; wherein the linear transformation further depends on the eigenvectors of the antenna correlation matrix;
    wherein:
        the transmitter has M antennas where M is an integer greater than two, the second processor is operative to determine the M eigenvalues $(\lambda_{r,1} \lambda_{r,2}, \ldots, \lambda_{r,M})$ of the antenna correlation matrix
        and to calculating values of the following parameters $$\beta_i = \left[\left(\frac{1}{\lambda_{r,1}^2} - \frac{1}{\lambda_{r,i}^2}\right) + \left(\frac{1}{\lambda_{r,2}^2} - \frac{1}{\lambda_{r,i}^2}\right) + \ldots + \left(\frac{1}{\lambda_{r,M}^2} - \frac{1}{\lambda_{r,i}^2}\right)\right] / \left(\frac{E_s}{\sigma^2}\right),$$

wherein $E_s/\sigma^2$ is a ratio of symbol energy to noise variance;
    the linear transformation being determined from these values and from the eigenvectors of the antenna correlation matrix.

6. A transmitter according to claim 5, wherein the first processor operative to determine the antenna correlation matrix (R) makes the determination from channel estimates.

7. A linear transformation apparatus operative to transform symbols from or to a space-time block encoder to at least partially compensate for correlation between antennas of a transmitter comprising three or more antennas, comprising: a first processor operative to determine an antenna correlation matrix (R), and a second processor operative to:
determine the eigenvalues of the antenna correlation matrix;
determine the ratio of symbol energy ($E_s$) to noise variance; and
determine a linear transformation matrix (L) to be applied dependent upon the eigenvalues and on the ratio of symbol energy to noise variance; wherein the linear transformation further depends on the eigenvectors of the antenna correlation matrix;

wherein:
the transmitter has M antennas where M is an integer greater than two, the second processor is operative to determine the M eigenvalues ($\lambda_{r,1}, \lambda_{r,2}, \ldots, \lambda_{r,M}$) of the antenna correlation matrix
and to calculating values of the following parameters $\beta_i = [(1/\lambda_{r,1}^2 - 1/\lambda_{r,i}^2) + (1/\lambda_{r,2}^2 - 1/\lambda_{r,i}^2) + \ldots + (1/\lambda_{r,M}^2 - 1/\lambda_{r,i}^2)]/(E_S/\sigma^2)$, $i=1,2,\ldots,M$ wherein $E_s/\sigma^2$ is a ratio of symbol energy to noise variance; the linear transformation being determined from these values and from the eigenvectors of the antenna correlation matrix.

8. A method of linear transformation of symbols from or to a space-time block encoder to at least partially compensate for correlation between antennas of a transmitter comprising at least three antennas, the method comprising the steps of:

determining an antenna correlation matrix;
determining the eigenvalues of the antenna correlation matrix; and
determining the ratio of symbol energy to noise variance, and determining a linear transformation matrix (L) to be applied dependent upon the eigenvalues and on the ratio of symbol energy to noise variance; wherein the linear transformation further depends on the eigenvectors of the antenna correlation matrix;

wherein:
the transmitter has M antennas where M is an integer greater than two, the channel correlation matrix has M eigenvalues, denoted $\lambda_{r,1}, \lambda_{r,2}, \ldots, \lambda_{r,M}$,
$E_s/\sigma^2$ is a ratio of symbol energy to noise variance;
the method further comDrises calculating values of parameters $\beta_i = [(1/\lambda_{r,1}^2 - 1/\lambda_{r,i}^2) + (1/\lambda_{r,2}^2 - 1/\lambda_{r,i}^2) + \ldots + (1/\lambda_{r,M}^2 - 1/\lambda_{r,i}^2)]/(E_S/\sigma^2)$, $i=1,2,\ldots,M$, and the linear transformation is determined from these values and from the eigenvectors ($w_1, w_2, w_3, \ldots w_M$) of the antenna correlation matrix.

* * * * *